United States Patent [19]
Eger et al.

[11] 3,950,249
[45] Apr. 13, 1976

[54] SANITARY WASTE TREATMENT PLANT

[75] Inventors: Leroy O. Eger; Samuel C. Crosby, both of Jacksonville, Fla.

[73] Assignee: Thetford Corporation, Ann Arbor, Mich.

[22] Filed: Mar. 14, 1975

[21] Appl. No.: 558,306

Related U.S. Application Data
[63] Continuation of Ser. No. 435,735, Jan. 23, 1974, abandoned.

[52] U.S. Cl. .................. 210/104; 4/10; 210/110; 210/126; 210/138; 210/152; 210/197; 210/195 S; 210/220; 210/256; 210/321 R
[51] Int. Cl.² ............... B01D 13/00; C02C 1/06
[58] Field of Search ............. 4/1, 10, 115; 137/205; 210/2–8, 14–16, 234, 138, 152, 167, 170, 195 M, 196, 197, 199, 220, 256, 321, 433, 532 R, 532 S, 533, 104, 105, 110, 116, 126–128; 302/14

[56] References Cited
UNITED STATES PATENTS

| | | | |
|---|---|---|---|
| 3,318,449 | 5/1967 | Jennings et al. | 210/104 |
| 3,440,669 | 4/1969 | Boester | 210/15 X |
| 3,472,765 | 10/1969 | Budd et al. | 210/23 UX |
| 3,487,937 | 1/1970 | Koulovatos | 210/195 M |
| 3,490,590 | 1/1970 | Davies | 210/23 UX |
| 3,493,496 | 2/1970 | Bray et al. | 210/433 X |
| 3,666,106 | 5/1972 | Green | 210/16 X |
| 3,679,053 | 7/1972 | Koulovatos et al. | 210/104 X |
| 3,681,236 | 8/1972 | Bergles et al. | 210/16 |
| 3,686,693 | 8/1972 | Liljendahl | 137/205 X |
| 3,713,543 | 1/1973 | Heaney | 210/256 X |
| 3,799,346 | 3/1974 | Freese | 210/195 X |
| 3,821,108 | 6/1974 | Manjikian | 210/433 X |
| 3,834,536 | 9/1974 | Kelsey | 210/104 |
| 3,844,946 | 10/1974 | Farrell, Jr. | 210/104 |

*Primary Examiner*—Charles N. Hart
*Assistant Examiner*—Robert H. Spitzer
*Attorney, Agent, or Firm*—Olsen and Stephenson

[57] ABSTRACT

A self-contained toilet and sanitary waste treatment plant that has a delivery system, a biological treatment system and a water recovery system. The delivery system includes a vacuum-type flush toilet adapted to receive flush water from the water recovery system and delivery means adapted to discharge the sanitary waste and flush water into the biological treatment system. The latter includes anaerobic digestion means, aerobic digestion means and sedimentation means for reducing the organic matter by biological treatment. The effluent from the biological treatment system is discharged to the water recovery system wherein primary and secondary filtration means are employed for reclaiming water for flush or other purposes. The primary filtration means includes ultra-filtration apparatus for separation of the effluent into a water permeate and an effluent concentrate, the former passing to the secondary filtration means for further filtration treatment and storage as flush water, and the latter passing back to the biological treatment system for further reduction by biological treatment. Controls are provided to enable the waste treatment plant to operate automatically for extended periods of time.

20 Claims, 16 Drawing Figures

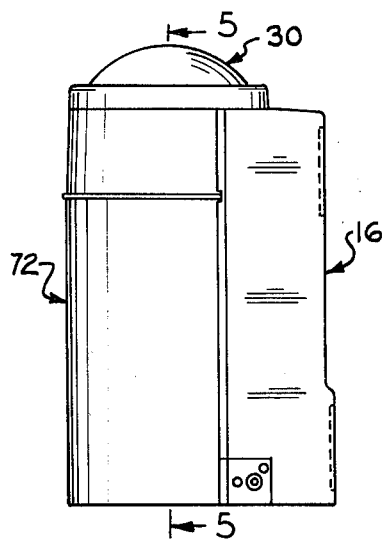
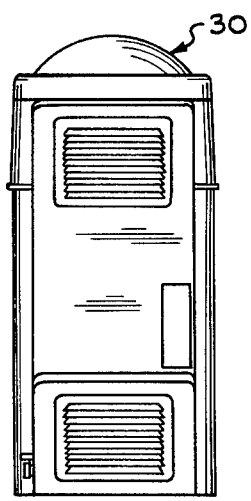
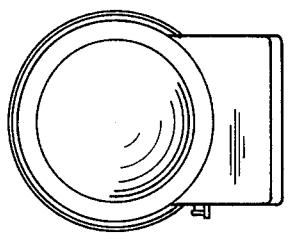
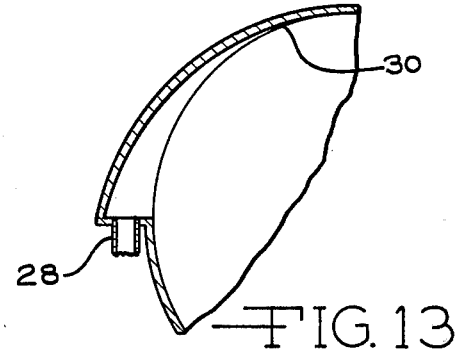
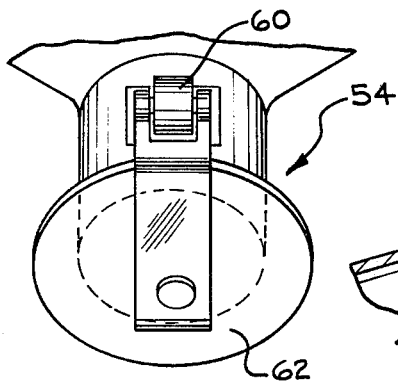
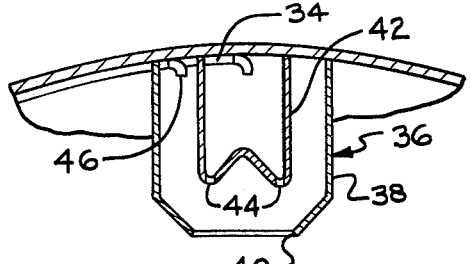
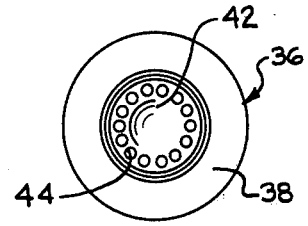
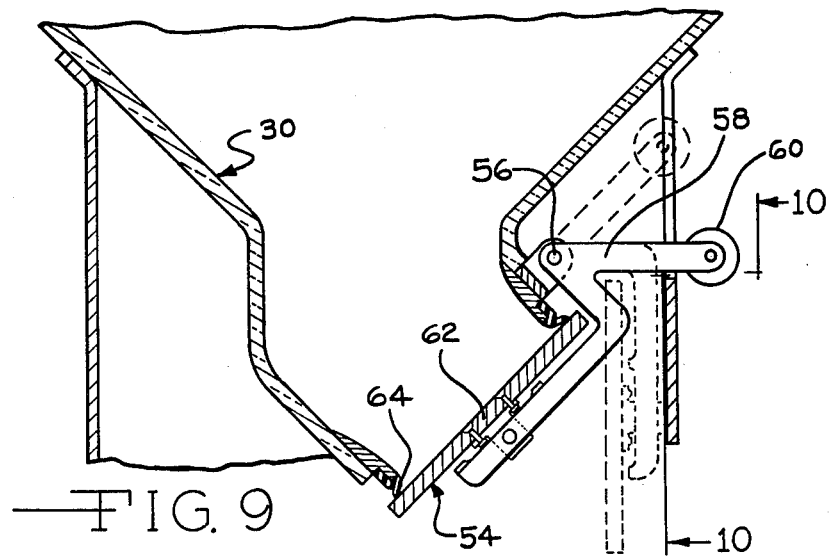

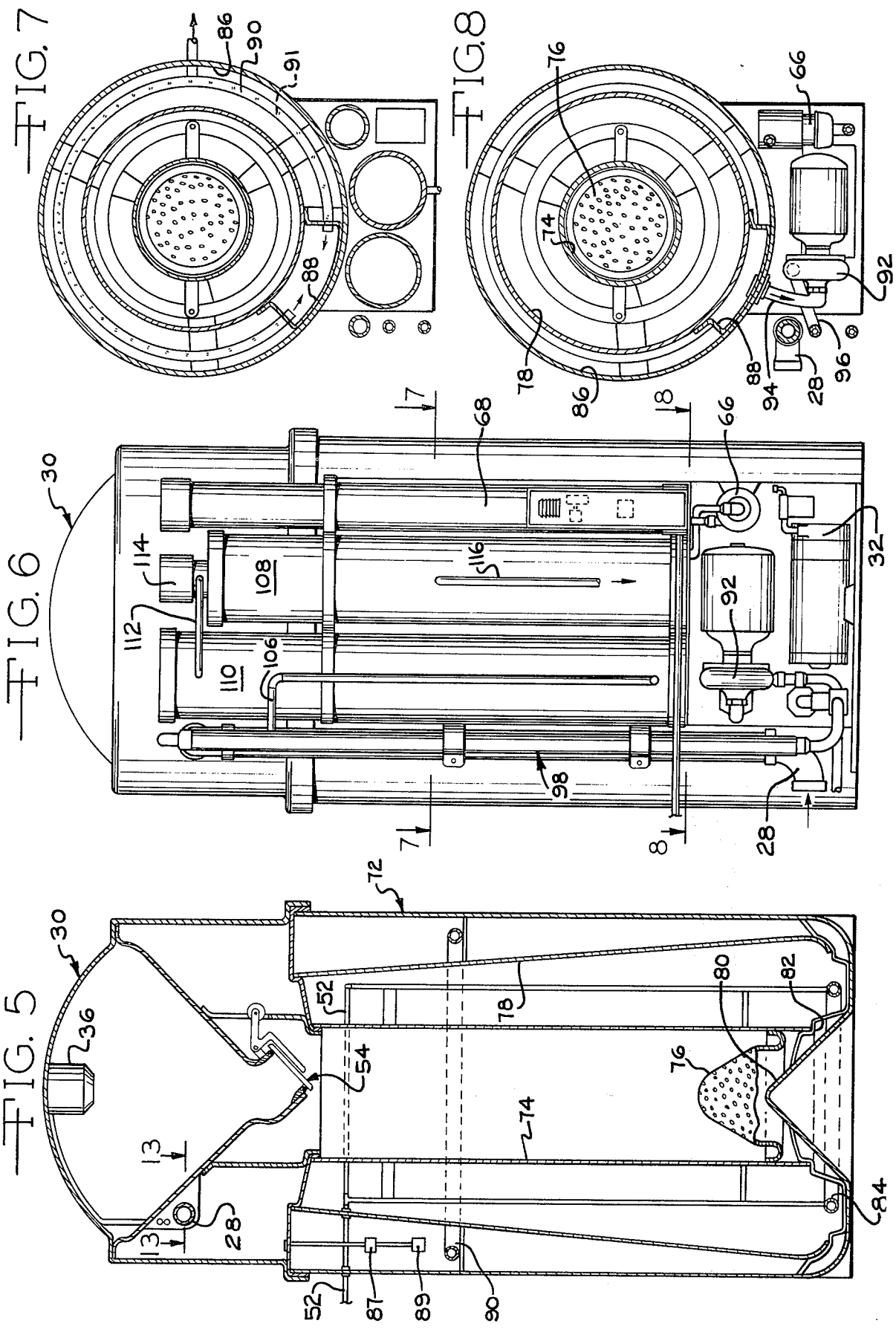

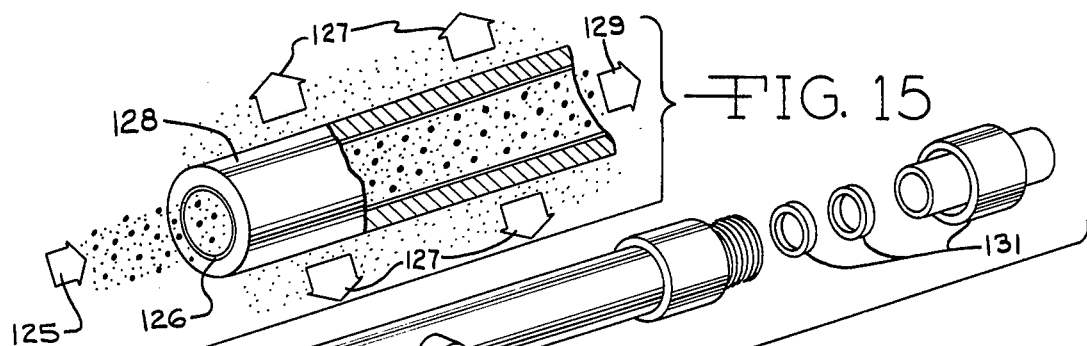
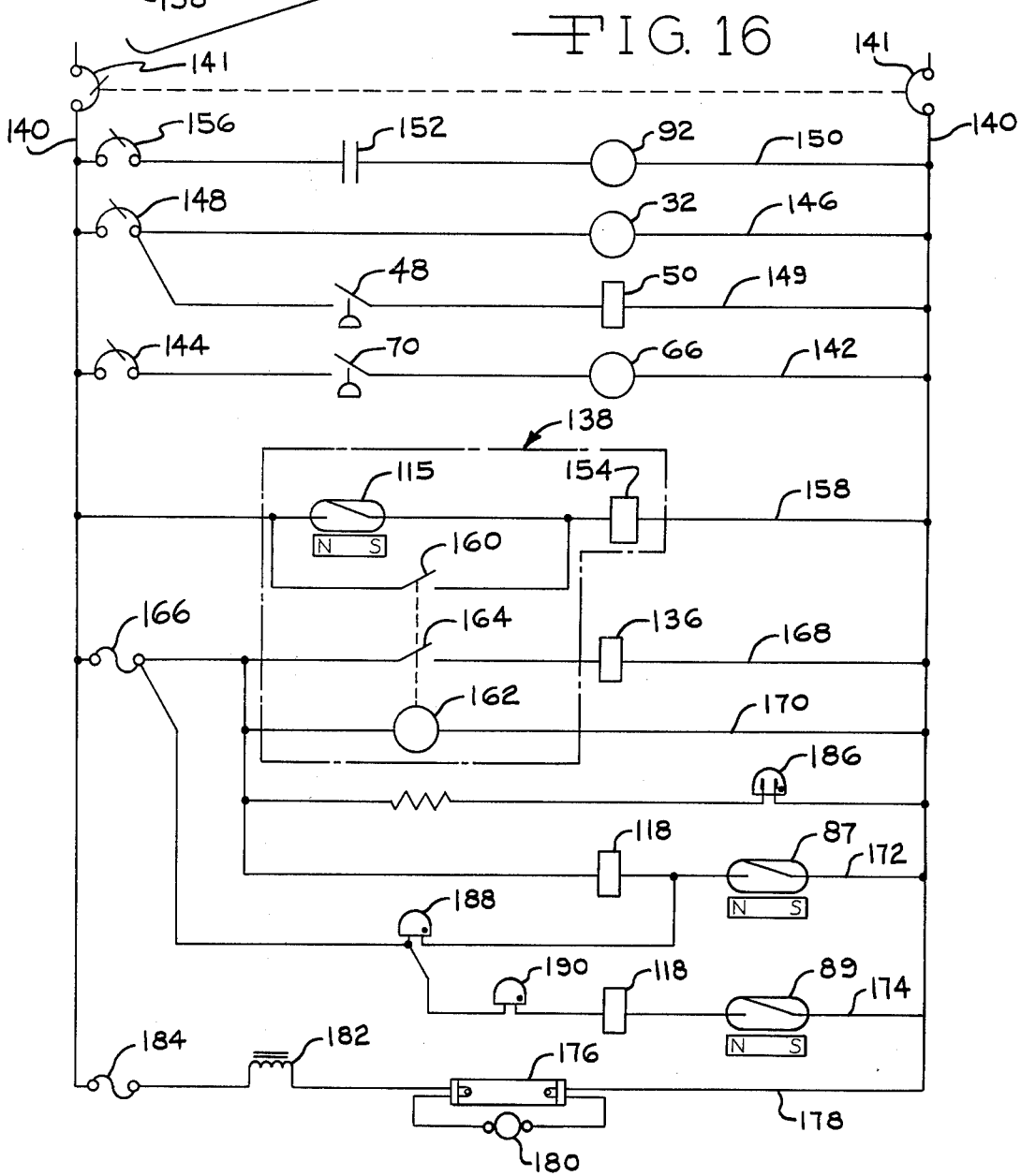

SANITARY WASTE TREATMENT PLANT

REFERENCE TO PENDING APPLICATION

This application is a continuation of pending application Ser. No. 435,735, filed Jan. 23, 1974 in the name of Leroy O. Eger, et al., for "Sanitary Waste Treatment Plant", now abandoned.

BACKGROUND OF THE INVENTION

The present invention relates to toilet and sanitary waste treatment apparatus, especially for use in areas where conventional sewer systems are not available or are inadequate to meet expanding needs.

The pollution of both surface and subsoil water supplies, as well as the spread of water-borne diseases has manifested the need for an effective and reliable means of both conveying and disposing of human sanitary waste in areas where municipal or other sewage and treatment does not exist Conventional means of copying with the problem include the septic tank, the holding tank, and incinerator and similar systems. The septic tank is the most common alternative, although its efficiency is directly related to the hydro-geological conditions of the soil and the availability of sufficient area for drain fields. The effluent from septic tank systems does not comply with environmental standards in nearly all instances, and can contribute to the pollution of potable water supplies and the spread of diseases. The holding tank may provide a temporary solution but it is not practical for a continuous need. The incinerator systems are generally unreliable and unpleasant.

The gravity flush toilet is the most common means of conveying sanitary waste to the septic tank. It requires on an average of from three to five gallons of water per flush. Thus, there exists a further need for a toilet and sanitary waste treatment system that will minimize the unnecessary usage of potable water.

Finally, a significant need exists to provide a sanitary waste disposal system which will allow the development of various land and geographical areas where a lack of such a system have prohibited the development. These areas include swampy and low-lying lands, rocky and mountainous terrains, lake shore and river side properties, and lands having arid climates, or sub-zero temperature wherein the soil is frozen impairing conventional systems.

In summary, there exists a need for a sanitary waste treatment plant which will provide improved means of conveying and disposing of human sanitary waste, which will prevent the pollution of both surface and sub-soil water supplies, which will prevent the spread of water-borne diseases, which will minimize the unnecessary usage of potable water, and which will allow the development of various lands that now remain undeveloped because of the inadequacy of conventional systems.

SUMMARY OF THE INVENTION

The present invention provides a self-contained toilet and sanitary waste treatment plant which has overcome the inadequacies of conventional systems that comprise the prior art.

According to one form of the present invention, a self-contained toilet and sanitary waste treatment plant is provided that has a delivery system, a biological treatment system and a water recovery system. The delivery system includes a flush-type toilet with a demand actuator, a bowl in which sanitary waste can be deposited, flush water supply means for supplying flush water to said bowl upon activation of the demand actuator, and delivery means for delivering the flush water and sanitary waste to the biological treatment system. The biological treatment system includes apparatus for reducing biologically the sanitary waste received from the delivery system and discharging an effluent to the water recovery system. The water recovery system includes ultrafiltration means for separation of the effluent into a water permeate and an effluent concentrate, and circulation means for returning the effluent concentrate to the biological treatment system for further reduction by biological treatment. The water recovery system includes a flush water storage means for receiving water from the ultrafiltration means, and the flush water supply means is in communication with the flush water storage means for supplying water to the bowl for flush purposes. In this form of the invention, a secondary filtration means is provided for polishing the water permeate which is then passed through a purifier means before the water is discharged into the storage means.

In a preferred form of the invention the toilet is a vacuum flush toilet and the delivery means includes a vacuum surge tank interposed between the toilet and the biological treatment system for receiving the flush water and sanitary waste prior to passage thereof into the biological treatment system. A conventional type vacuum toilet can be used for this purpose thereby substantially reducing the quantity of water required per flush when compared with the conventional gravity flush toilets using a standard water holding tank.

In the preferred form of the present invention, the biological treatment system includes an anaerobic digestion means for receiving flush water and sanitary waste from the surge tank of the delivery system and partially reducing the organic matter in the sanitary waste, an aerobic digestion means for receiving effluent from the anaerobic means and further reducing the organic matter therein, sedimentation means for receiving effluent from the aerobic digestion means for settling out a portion of the organic matter therein and for decanting relatively clear effluent for discharge to the water recovery system and means for returning the settled organic matter to the aerobic digestion means for further reduction. The sanitary waste treatment system also includes a recirculation tank in communication with the sedimentation means so that the decanted effluent is discharged into the recirculation tank, and the recirculation tank is in communication with the water recovery system for delivery thereto of the relatively clear effluent.

In this form of the invention, the effluent concentrate is returned to the recirculation system through a first passage means at a controlled rate of flow so that the effluent passing through the ultrafiltration means is subjected to a desired pressure therein, and a bypass means is provided for bypassing the first passage means for returning the effluent concentrate to the recirculation tank at a more rapid rate so that the ultrafiltration means can be cleaned periodically by usage of the bypass means. A timer control means is provided for intermittently opening the bypass means and starting a pump which supplies the effluent to the ultrafiltration means so that the ultrafiltration means can be cleaned periodically. This pump can also be started in response to a signal from the water storage means indicating a low level therein, which will occur on occasions when the water is delivered to the toilet bowl for flush purposes, thereby refilling the storage means to a normal level.

Suitable control means are provided throughout the self-contained toilet and sanitary waste treatment plant so that it will continue to function for long periods of time without significant attention on the part of the users. Thus, significant improvements have been made for conveying human sanitary waste into a biological waste treatment system while minimizing the use of potable water, and the plant that has been developed functions so that no waste matter is discharged therefrom which will serve to pollute either surface or subsoil water supplies. Further, the plant is constructed and arranged so that it can be used in any area irrespective of the terrain where the plant is desired to be installed.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 2 is a front elevational view of the self-contained toilet and sanitary waste treatment plant with the toilet removed for purposes of illustration;

FIG. 3 is a side elevational view of the treatment plant;

FIG. 4 is a top plan view thereof;

FIG. 5 is a vertical section taken on the lines 5—5 of FIG. 2;

FIG. 6 is a side elevational view with panel portions removed to illustrate various components of the treatment plant;

FIG. 7 is a horizontal section taken on the lines 7—7 of FIG. 6;

FIG. 8 is a horizontal section taken on the lines 8—8 of FIG. 6;

FIG. 9 is an enlarged fragmentary section showing details of the vacuum surge tank forming a part of the present invention;

FIG. 10 is a fragmentary side elevational view of the dump trap of the surge tank taken on the lines 10—10 of FIG. 9;

FIG. 11 is an enlarged vertical section taken through the air suction scrubber of the vacuum surge tank;

FIG. 12 is a bottom plan view of the air suction scrubber taken on the lines 12—12 of FIG. 11;

FIG. 13 is an enlarged fragmentary section taken on the lines 13—13 of FIG. 5;

FIG. 14 is a fragmentary exploded perspective view of a portion of the ultrafiltration means;

FIG. 15 is a schematic section of the interior of the ultrafiltration means showing passage of permeate and effluent concentrate; and FIG. 16 is a schematic diagram of the electrical control circuits of the present invention.

DESCRIPTION OF THE PREFERRED EMBODIMENT

Figure 1:
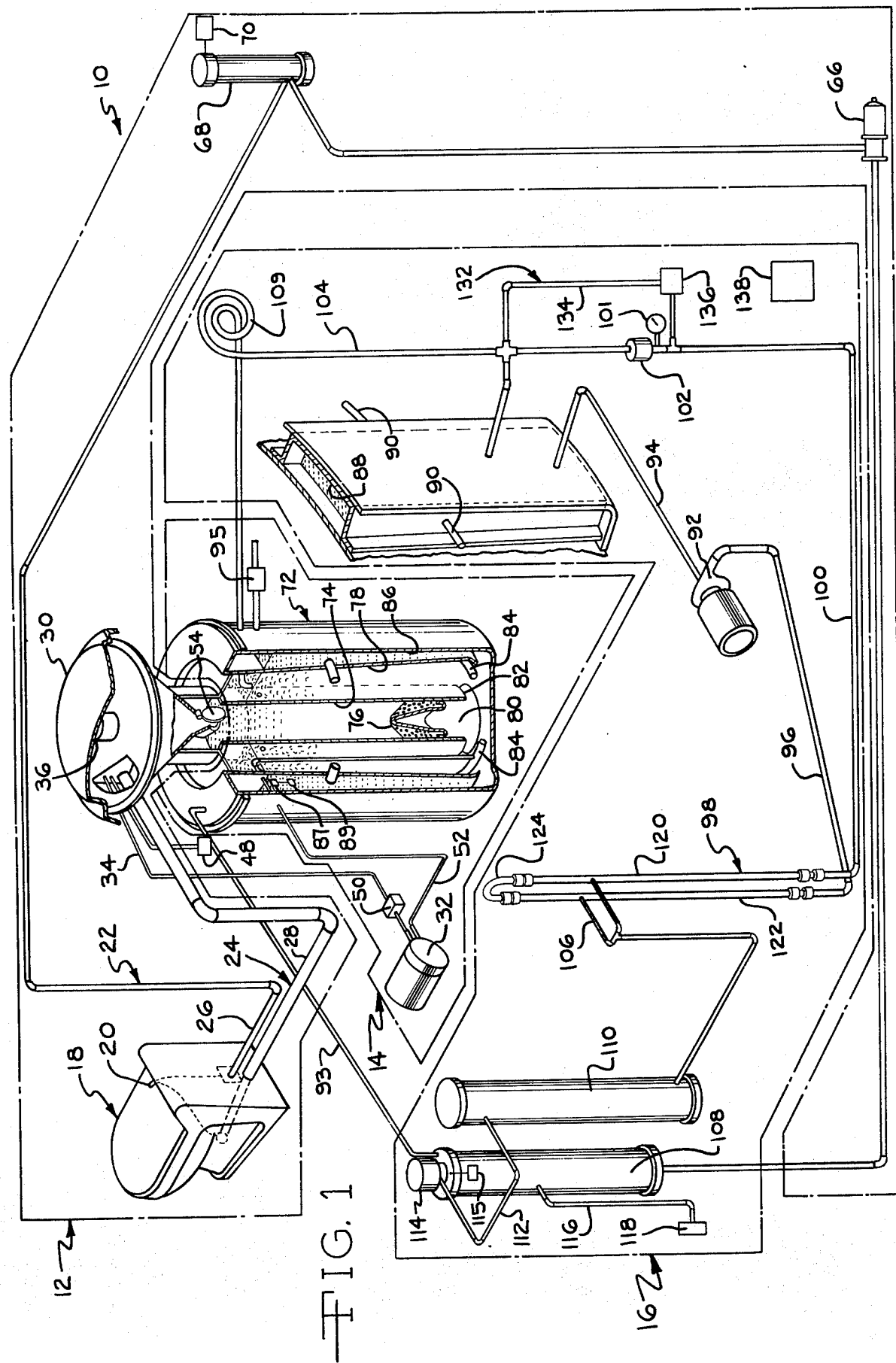
FIG. 1 is a perspective schematic illustration of a self-contained toilet and sanitary waste treatment plant embodying the present invention, and which includes broken lines to identify generally the components of the delivery system, the biological treatment system and the water recovery system.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The self-contained toilet and sanitary waste treatment plant 10 comprises a delivery system 12, a biological treatment system 14, and a water recovery system 16. In some instances the biological treatment system 14 and water recovery system 16 can be used separate from the delivery system 12, and it is to be under stood that the invention resides in the combination of the three systems as well as the combination of the biological treatment system and the water recovery system.

Delivery System

In one form of the present invention, the delivery system 12 comprises a flush-type toilet 18 with a demand actuator 20 and a bowl (not shown) in which sanitary waste can be deposited, flush water supply means for supplying flush water to the bowl upon activation of the demand actuator 20, and delivery means 24 for delivering the flush water and sanitary waste from the bowl to the biological treatment system 14.

In the illustrated embodiment, the toilet 18 is a conventional-type vacuum toilet, and its construction will not be described in detail. It receives water for flush purposes from the flush water means 22 via the conduit 26, and a vacuum valve (not shown) is located at the base of the bowl of the vacuum toilet and the human sanitary waste and flush water are removed from the bowl to the biological treatment system via the conduit 28.

The delivery means 24 includes a vacuum surge tank 30 in communication with the toilet 18 by means of the conduit 28. In normal operation, the interior of the vacuum surge tank 30 will be maintained at a partial vacuum by operation of the vacuum and aeration pump 32 that is part of the biological treatment system 14. The pump 32 also serves to supply air to the biological treatment system, and for reasons of economy and efficient operation it is used to perform the dual functions of supplying air to the biological treatment system, as will be described, and also to maintain the desired vacuum in the vacuum surge tank 30.

Air and other gases are removed from the vacuum surge tank 30 by the vacuum and aeration pump 32 via the conduit 34 which has its upstream end located at the top of the surge tank 30 in the air scrubber 36. The latter includes an outer casing 38 open at the bottom at 40 to allow air and gases to enter the casing and an inner casing 42 having a plurality of apertures 44 around its base for entry of air and gases but for excluding solid matter. Thus, air and other gases can be removed from the vacuum surge tank 30 by the vacuum and aeration pump 32 substantially free of any significant amounts of solid matter which might otherwise impair operation of the pump 32. Also, extending into the air scrubber 36 is the pressure sensing probe 46 which is in communication with the vacuum switch 48. The latter is responsive to the probe 46 and is electrically arranged to control the three-way solenoid valve 50 so that the vacuum and aeration pump 32 can operate continuously to supply air to the biological treatment system 14. The air will be taken from the vacuum surge tank 30 only for such time periods as are necessary to maintain a predetermined partial vacuum in the surge tank 30, and at all other times the three-way solenoid valve 50 will be open to atmosphere and closed to surge tank 30 so that the vacuum and aeration pump 32 can discharge air via conduit 52 to the biological treatment system 14 as will be described hereafter.

The vacuum surge tank 30 is funnel-shaped and the conduit 28 enters the surge tank 30 at a tangential location as can be seen in FIGS. 5 and 13. If desired, spiral deflectors can be located in the vacuum surge tank to prevent vortexing of waste in the tank. When a vacuum system is used, the waste will be discharged into the vacuum surge tank at a high velocity, and the deflectors can serve to prevent the vortexing and also to cooperate in disintegrating the solid particles of waste material.

The bottom of the funnel-shaped vacuum surge tank 30 is closed at the bottom by a dump trap 54. The dump trap 54 is mounted on a pivot 56 and can be pivoted between the solid line position shown in FIG. 9 wherein it closes the bottom of the vacuum surge tank 30 and the broken line position wherein it is in its open position to allow discharge of the contents of the surge tank 30 into the biological treatment system 14. The dump trap 54 includes the bell crank 58 which has a weight 60 at the end of one of its arms and which has the sealing plate 62 mounted on the end of its other arm. When a vacuum exists within the tank 30, the bell crank 58 will be in the closed position with the plate 62 in sealed relation with respect to the seal 64 located at the outlet of the vacuum surge tank 30. When atmospheric pressure conditions exist within the surge tank 30 and a pressure head exists against the dump trap 54 such as occurs when flush water and sanitary waste are discharged into the surge tank 30, the pressure head within the surge tank 30 will act against the dump trap 54 to move it to its open position. Thereafter, when the pressure head has been reduced by discharge of the waste material, the weight 60 will function to pivot the dump trap 54 to the closed position after which a partial vacuum will again be created within the surge tank 30 by the action of pump 32. Then the trap door 54 will be maintained in a sealed position at the bottom of the surge tank 30 until the latter is again opened to atmospheric pressure by activation of the demand actuator 20.

In the illustrated embodiment of the invention, the flush water supply means 22 includes the pressure pump 66, the pressure tank 68 and the conduits in communication therewith whereby the pressure pump can supply flush water from a selected source to the pressure tank 68 from which it can be discharged to the toilet 18 upon demand. A suitable pressure switch 70 is provided in association with the pressure tank 68, the pressure switch 70 being electrically connected with the pressure pump 66 to activate the pump when the pressure in the tank 68 drops below a predetermined minimum. Similarly, the pressure switch 70 will function to de-energize the pressure pump 66 when a preselected maximum pressure within the pressure tank 68 has been achieved.

In the illustrated embodiment of the invention the flush water supply means is in communication with the water recovery system 16 for utilizing the recovered water, but it will be understood that under desired circumstances the pressure pump 66 may be connected in communication with an independent source of flush water if the need for an independent source should arise.

Biological Treatment System

The biological treatment system 14 includes apparatus comprising the treatment tank 72 for reducing biologically the sanitary waste received from the delivery system 24 and for discharging an effluent to the water recovery system 16 as will be described. The apparatus 72 includes an upright anaerobic digestion chamber 74 for receiving sanitary waste from the dump trap 54 located at the end of the delivery system 12 and for partially decomposing the organic matter in the sanitary waste. In the anaerobic digestion chamber, the waste is allowed to hydrolyze and is partially digested by micro-organisms (anaerobic bacteria) which propogate without the presence of dissolved oxygen in the water. Initial sizing of the solids is accomplished by a conical grate 76 located in the lower portion of the chamber. Larger solids accumulate at the base of the grate and remain in the anaerobic digestion chamber 74 until they have been sufficiently reduced in size to allow their passage through the grate.

An upright aerobic digestion chamber 78 is disposed around the anaerobic chamber 74 and is in fluid communication therewith at the lower ends of the two chambers. During operation, as soon as the solid particulates have been reduced to such a size as to pass through the grate 76, they are distributed into the aerobic digestion chamber 78 by means of the distributor cone 80 centrally located with respect to the anaerobic digestion chamber 74. Passage means 82 are provided to allow the small solids to enter the aerobic digestion chamber 78. After retention in the anaerobic digestion chamber 74, the solid waste enters the aerobic digestion chamber 78 wherein predominantly aerobic micro-organisms (or bacteria) require oxygen to propagate. The oxygen demand in this phase of treatment is supplied by means of a porous air diffuser 84 located in the lower portion of the aerobic digestion chamber 78.

The air difffuser 84 has a nominal pass size of 10 microns and is supplied with air from the vacuum and aerator pump 32 via the conduit 52. In the aerobic phase of treatment the micro-organisms will absorb oxygen, while at the same time they will feed on both the organic and inorganic solids. The propagation of the micro-organisms will release enzymes which have a high potential for the oxidation and liquefaction of solids. The air diffuser 84 also functions to create a pumping action by lowering the density of the water in the aerobic digestion chamber 78. This in turn creates a negative pressure at the egress point from both the anaerobic digestion chamber 74 and the upright sedimentation chamber 86 disposed outwardly of the aerobic digestion chamber 78 and communicating therewith at the lower ends of the two chambers. Thus, the solid or semi-solid particulates are caused to be pulled into the aerator digestion chamber. This action retards the accumulation of sludge or mud at the bottom of the treatment apparatus 72 and causes virtually all of the solids to remain in suspension to create a highly effective activated sludge system which utilizes the maximum effect the bio/chemical oxidation.

Upon demand, water flows from the aerobic digestion chamber 78 into the sedimentation chamber 86. In the sedimentation chamber 86 the water will be maintained in a calm, nonturbulent condition to allow suspended solids to settle out and to allow semi-solids to floc and then settle. Once the suspended solids and floc have settled to the bottom portion of the sedimentation chamber 86, they are allowed to egress the sedimentation area and are returned by means of the negative pressure produced by the air diffuser 84 into the aerobic digestion chamber 78 for further oxidation.

Formed integrally with the apparatus 72 is a recirculation chamber 88 which can, if desired, be constructed as a separate tqnk from the apparatus 72, but which in the present embodiment is a segment formed in the annular sedimentation chamber 86. The recirculation chamber 88 which is a part of the water recovery system 16 is in communication with the sedimentation chamber 86 by the sedimentation feed ring or decanting means 90 which is a conduit with inlet openings 91 facing the bottom of the sedimentation chamber 86 so that passage of suspended solids through the inlet openings 91 is minimized. It will be observed in FIG. 7 that the aggregate effective inlet opening area of the openings 91 progressively increases with the distance to be travelled by the entering water to the outlet, thereby to equalize the rate of flow into the decanting means 90 throughout its length and to minimize turbulence in the sedimentation chamber 86. The outlet ends of the decanting means 90 extend into the recirculation chamber 88 to discharge water as indicated by the arrows in FIG. 7. Upon demand, effluent will be decanted from the sedimentation chamber 86 through the decanting means 90 into the upright recirculation chamber 88.

As part of the controls for operation of the treatment plant 10, the sedimentation chamber 86 includes the high level switch 87 and the low level switch 89. High level switch 87 is electrically connected to solenoid valve 118 (to be described in water recovery system 16) and low level switch 89 is electrically connected to water inlet solenoid valve 95 for supplying water to the treatment plant, if required. A vent conduit 93 is also provided between the sedimentation chamber 86 and the water storage tank 108 (to be described). The conduit 93 can also function to allow overflow from tank 108 to return to sedimentation chamber 108.

Water Recovery System

The water recovery system 16 includes a filtration and recirculation pump 92 for pumping effluent from the recirculation chamber 88 via conduits 94 and 96 to the ultrafiltration means 98 where the effluent can be separated into a water permeate and an effluent concentrate. The effluent concentrate is returned via conduit 100, the pressure gage 101, and the throttle 102 to the recirculation chamber; a portion of the effluent concentrate is returned via the restricted conduit 104 to the aerobic digestion chamber 78. The permeate from the ultrafiltration means 98 is discharged therefrom via conduits 106 for ultimate storage in the storage means 108.

The restricted conduit 104 will contain means to regulate the rate of flow of the effluent concentrate without at the same time impeding the return flow of particulate matter in the concentrate. A spiral winding, as at 109 may serve this purpose.

In the disclosed embodiment of the invention, the permeate first flows through a secondary filtration means for polishing the water permeate, this being accomplished in the disclosed embodiment by passage of the permeate through the activated carbon filter means 110 after which it is discharged therefrom via conduit 112 for passage through the ultraviolet purifier 114 and subsequent discharge into the water storage means 108. As previously explained when describing the delivery system, the purified water in the water storage means 108 can thereafter be utilized by operation of pressure pump 66 for supply of flush water to the toilet 18. For this purpose a flush water demand level switch 115 is provided to activate the pump 92 when water in storage means 108 descends below a preselected level. A separate discharge conduit 116 is also provided for discharging water from the storage means 108 through the solenoid valve 118 in response to control signals that will be described hereinafter.

The ultrafiltration means 98 includes two tubular filter tubes 120 and 122 connected at their upper ends by a return conduit 124. Only one tube will be described in detail because the tubes 120 and 122 are constructed identically the same. With reference now to FIGS. 14 and 15, the one tube assembly 120 will be described in greater detail. The tube 120 includes a semi-permeable membrane 126 supported by a porous support tube 128 both of which are encased in the outer tubular member 130 which serves as a collector for the permeate which can then be discharged via the conduits 106. Effluent, indicated by arrow 125, from the recirculation chamber 88 is pumped through the semi-permeable membrane 126 at a moderately low pressure and a high velocity. As shown schematically in FIG. 15, the permeate, indicated by arrows 127, passes through the semipermeable membrane 126 and the support 128 for collection by the discharge tube 120 and for discharge via outlet means or conduit 106. The effluent concentrate, indicated by arrow 129, flows axially out of the end of membrane 126 for return to the recirculation chamber 88. In normal operation, a pressure in the range of 20 pounds per square inch and a velocity of 10 feet per second flow through the tubular membrane 126 is considered to be satisfactory. The elements 131 are seals and fittings for assembling the filtration tube 120.

To obtain the most effective use of the ultrafiltration means 98 it is necessary that the interior of the semipermeable membrane 126 be periodically flushed. For this purpose flow control means 132 are provide which include the throttle 102 and the bypass conduit 134 which includes the solenoid valve 136. The latter is electrically connected to a timer control means 138 so that the solenoid valve 136 will be opened at selected time intervals to allow return of effluent from the ultrafiltration means 98 directly to the recirculation chamber 88 is a substantially more rapid rate than is permitted when the effluent is discharged via the throttle 102, to the recirculation chamber 88.

The timer control means 138 is also electrically connected to the filtration or recirculation pump 92 so that the latter is energized simultaneously with opening of the solenoid valve 136 in response to control signals from the timer control means 138. In normal operation, the timer control means 138 may be set so that the pump 92 and the solenoid valve 136 are energized at five-hour intervals and remain energized for a limited period of time, such as five minutes. During this time period a substantially lower back pressure will be present in the return flow to the recirculation chamber 88. Thus, when the bypass means 132 is in operation, the rate of flow of effluent through the ultrafiltration means 98 may be at a velocity of 15 feet per second which will result in a pressure in the tubular membrance member 126 of only 4 pounds per square inch. This will have the effect of quickly flushing out the semi-permeable membrane 126 so that it will be more effective in its operation thereafter. To provide optimum flow conditions within the tubular membrane 126, a volume displacement rod 138 is inserted lengthwise through tubular membrane 126 and is supported in spaced relation thereto. This arrangement reduces the cross sectional area of the membrane tube which in turn provides higher velocity conditions at reduced volume flow.

Referring now to FIG. 16, a brief description will be given of the electrical circuit for controlling operation of the treatment plant 10. Alternating current is supplied across the line 140 and a main circuit breaker 141 is provided which serves as a main power disconnect and manual system switch. As previously indicated, the pressure pump 66 is provided for supplying flush water to the pressure tank 68 from which the water can be discharged upon demand to the vacuum toilet 18. The pressure pump 66 is connected across the power lines 140 by the conductor 142 and is in series with the pressure switch 70 located in pressure tank 68 and with the pressure pump circuit breaker 144 which also serves as a manual switch for the pressure pump 66.

The vacuum and aeration pump 92 is electrically connected across the lines 140 by the conductor 146 and is in series with the circuit breaker 148 which also serves as a manual switch for this pump. The vacuum and aeration pump 32 is associated with the three-way valve 50 so that when the vacuum switch 48 is open, de-energizing solenoid valve 50 via conductor 149 the vacuum and aeration pump 32 will take a suction from the atmosphere, and when the vacuum switch 48 closes, energizing the solenoid valve 50, the vacuum and aeration pump 42 will take a suction from the vacuum surge tank 30. The vacuum switch 48 is of a type in which its contacts are closed below 12 inches of mercury on decreasing vacuum and are opened above 15 inches of mercury on increasing vacuum. Thus the vacuum and aeration pump will continuously operate so as to supply air to the biological treatment system 14, and pump 32 will receive its source of air either from atmosphere or from the vacuum surge tank 30, as was previously described.

The recirculation and filtration pump 92 is also connected across the main power lines 140 by a conductor 150, and the recirculation pump 92 is in series with the contacts 152 of relay 154 and the recirculation pump circuit 156 which also serves as a manual switch for the recirculation pump 92. The relay 154 is located in timer 138 and is electrically connected across the power lines 140 by the conductor 158 and is in series with the flush water demand magnetic level switch 115. Thus, when the water in the flush water storage tank 108 drops below a predetermined level, the level switch 115 will close energizing relay 154, thereby closing contacts 152 so that the recirculation pump 92 is energized. The pump 92 will continue to operate until the level switch 115 is again opened due to the level of water in the tank 108 reaching a pre-selected upper level.

In parallel with the flush water demand magnetic level switch 115 are the normally open contacts 160 which are part of and are controlled by action of the timer 138. When the timer 138 functions to close the contacts 160, relay 154 will also be energized closing relay contacts 152 and thereby energizing recirculation pump 92. Thus, the recirculation pump 92 will be placed in operation either in response to a signal from the level switch 115 or in response to a signal received from the timer 138.

The timer 138 includes the timer motor 162 which controls the timer switch 160 and which also controls the timer switch 164. The latter is in series with the bypass solenoid valve 136 so that the bypass valve 136 will open in timed relation to the closing of the timer switch 164. It will be observed that the bypass valve 136, timer switch 138 and fuse 166 are in series in the conductor 168. The timer motor 162 is in the conductor 170 and is also in series with the fuse 166. As previously explained, the timer motor 162 is preferably operable to close the timer switches 160 and 164 at five-hour intervals and to maintain the switches closed for 5-minute periods of time. This will also result in the bypass valve 136 being open during these 5-minute periods of time to assure that the ultrafiltration means 98 are periodically flushed.

The high level magnetic switch 87 which is located in the sedimentation tank 86 is associated with the conductor 172 and is in series with the high level valve 118 associated with the water storage tank 108 so that when the high level magnetic switch 172 is closed in response to a high level condition within the sedimentation tank 86, the solenoid valve 118 will be energized to open so as to discharge water from the flush water storage tank 108. The low level magnetic switch 89 which is also in the sedimentation tank 86 is associated with conductor 174 and is in series with the two-way solenoid valve 95 for opening the latter to permit water to be introduced into the sedimentation tank in the event that the level therein falls below a preselected minimum level.

The ultraviolet purifier 114 is electrically operated and is a conventional ultraviolet lamp 176 which is in the conductor 178. Associated with the lamp 176 is the conventional starter 180. Also in series with the ultraviolet lamp 176 is a conventional ballast 182 and a conventional fuse 184. Suitable pilot or warning lamps are also located in the electrical system at 186, 188 and at 190, these lamps serving obvious warning or indicating functions.

It is claimed:

1. A water-recycling sanitary waste treatment plant comprising a delivery system, a biological treatment system and a water recovery system;

said delivery system including a flush-type toilet with a demand actuator and a bowl in which sanitary waste can be deposited, flush water supply means for transferring clear water from the water recovery system to the delivery system and for supplying the clear water as flush water under pressure to said bowl upon activation of said demand actuator, and delivery means for delivering the flush water and sanitary waste to said biological treatment system in response to activation of said demand actuator;

said biological treatment system including apparatus for reducing biologically the sanitary waste received from the delivery system and discharging an effluent to said water recovery system; and, said water recovery system including ultrafiltration means for separation of said effluent into a water permeate and an effluent concentrate, said ultrafiltration means having a semipermeable tubular membrane into one end of which said effluent is introduced axially at a first pressure and from the other end of which said effluent concentrate is discharged, and a permeate collector tube that surrounds said tubular membrane for collecting at a lower second pressure permeate that passes radially through the membrane, recirculation means including a pump means for returning a portion of said effluent concentrate to said biological treatment system and for returning the remainder of said effluent concentrate at said first pressure to said ultrafiltration means for further separation into water permeate and effluent concentrate, water storage means, a secondary filtration means for receiving and polishing said water permeate, said secondary filtration means being in communication with said ultrafiltration means so that said permeate can be discharged at said second pressure from said ultrafiltration means to said secondary filtration means to be polished and discharged to said water storage means as clear water, and said water storage means being in communication with said delivery system for transfer thereto of the clear water by said flush water supply means.

2. The sanitary waste treatment plant that is defined in claim 1, wherein said toilet is a vacuum flush toilet, and said delivery means includes a vacuum surge tank interposed between said toilet and said biological treatment system and a vacuum and aeration pump for maintaining a partial vacuum in said surge tank and for discharging air to said biological treatment system for aerobic digestion of organic matter.

3. The sanitary waste treatment plant that is defined in claim 1, wherein said apparatus includes an upright anaerobic digestion chamber for receiving said sanitary waste from the delivery system and partially decomposing the organic matter therein, an upright aerobic digestion chamber disposed around said anerobic chamber and fluidly communicating therewith, said aerobic digestion chamber having air diffuser means therein adjacent to the bottom thereof for introducing air for aerobically decomposing the organic matter therein, an upright sedimentation chamber disposed outwardly of said aerobic digestion chamber and at least partly therearound, said sedimentation chamber fluidly communicating with said aerobic digestion chamber, said sedimentation chamber receiving effluent from said aerobic digestion chamber for settling out a portion of the organic matter therein for return to said aerobic digestion chamber and having therein decanting means for removing a relatively calm effluent therefrom, said recirculation means being associated with said decanting means for receiving relatively clear effluent.

4. The sanitary waste treatment plant that is defined in claim 1, wherein said recirculation means includes a restrictor conduit for return of said portion of said effluent concentrate to said biological treatment system for further reduction by biological treatment.

5. The sanitary waste treatment plant that is defined in claim 1, wherein said recirculation means includes a throttle means for regulating the rate of flow of said effluent concentrate from said ultrafiltration tube and thereby the fluid flow condition within said ultrafiltration tube.

6. The sanitary waste treatment plant that is defined in claim 1, wherein said water recovery system includes an ultraviolet purifier for purifying the clear water from said second filtration means prior to its discharge into said water storage means.

7. The sanitary waste treatment plant that is defined in claim 1, wherein said storage means has a level sensing means therein, and said pump means is operable for pumping effluent from said biological treatment system through said ultrafiltration means in response to a signal from said level sensing means indicating that the water level is below a preselected level.

8. The sanitary waste treatment plant that is defined in claim 1, wherein said biological treatment system includes high-level sensing means for sensing the level of the contents therein, and said water storage means includes an outlet valve means adapted to open in response to a signal from said high-level sensing means when the latter indicates that said contents are above preselected level.

9. The sanitary waste treatment plant that is defined in claim 1, wherein said biological treatment system includes low-level sensing means for sensing the level of the contents therein, and said biological treatment system includes an inlet valve means in communication with a source of water and adapted to open in response to a signal from said low-level sensing means when the latter indicates that said contents are below a preselected level.

10. The sanitary waste treatment plant that is defined in claim 1, wherein said apparatus includes an anaerobic digestion means for receiving flush water and sanitary waste from said delivery system and partially reducing the organic matter therein, an aerobic digestion means for receiving effluent from said anaerobic means and further reducing the organic matter therein, sedimentation means for receiving effluent from said aerobic digestion means for settling out a portion of the organic matter therein and for decanting relatively clearer effluent for discharge to said water recovery system, and means for returning the settled organic matter in said sedimentation means to said aerobic digestion means.

11. The sanitary waste treatment plant that is defined in claim 10, wherein a recirculation tank is in communication with said sedimentation means so that the decanted effluent is discharged into the recirculation tank, said recirculation tank being in communication with said ultrafiltration means for delivery thereto of said relatively clear effluent.

12. The sanitary waste treatment plant that is defined in claim 11, wherein said recirculation means is in communication with said aerobic digestion means for returning effluent concentrate from the ultrafiltration means to the biological treatment system.

13. The sanitary waste treatment plant that is defined in claim 1, wherein said toilet is a vacuum flush toilet and said delivery means includes a vacuum surge tank interposed between said toilet and said biological treatment system for receiving the flush water and sanitary waste prior to passage thereof into said biological treatment system, and a vacuum and aeration pump for maintaining a partial vacuum in said surge tank.

14. The sanitary waste treatment plant that is defined in claim 13, wherein said vacuum and aeration pump is in communication with said biological treatment system so that air removed from said surge tank can be discharged to said biological treatment system to facilitate aerobic digestion of organic matter therein.

15. The sanitary waste plant that is defined in claim 14, wherein valve means responsive to the vacuum in said surge tank are operably associated with said vacuum and aeration pump for opening the suction side of said pump to atmosphere when a vacuum of predetermined magnitude is in said surge tank so that air can be delivered from said pump to said biological treatment system at times when the pump is not delivering air thereto from said surge tank.

16. The sewage treatment plant that is defined in claim 13, wherein said vacuum surge tank includes a dump trap mechanism providing communication between the interior of the vacuum surge tank and said biological treatment system, said dump trap mechanism being urged to a closed position and responsive to a predetermined pressure head of flush water and sanitary waste in the interior of the vacuum surge tank to open so as to discharge the flush water and sanitary waste into said biological treatment system.

17. A sanitary waste treatment plant comprising a delivery system, a biological treatment system and a water recovery system, said delivery system including, a flush-type toilet with a demand actuator and a bowl in which sanitary waste can be deposited, flush water supply means for supplying flush water under pressure to said bowl upon activation of said demand actuator, and delivery means for delivering the flush water and sanitary waste to said biological treatment system in response to activation of said demand actuator, said biological treatment system including apparatus for reducing biologically the sanitary waste received from the delivery system and discharging an effluent to said water recovery system, said apparatus including an upright anaerobic digestion chamber for receiving said sanitary waste from the delivery system and partially decomposing the organic matter therein, an upright aerobic digestion chamber disposed around said anaerobic chamber and fluidly communicating therewith, said aerobic digestion chamber having air diffuser means therein adjacent to the bottom thereof for aerobically decomposing the organic matter therein, an upright sedimentation chamber disposed outwardly of said aerobic digestion chamber and at least partly therearound, said sedimentation chamber fluidly communicating with said aerobic digestion chamber, said sedimentation chamber receiving effluent from said aerobic digestion chamber for settling out a portion of the organic matter therein for return to said aerobic digestion chamber and having therein decanting means for removing a relatively calm effluent therefrom, and recirculation means associated with said decanting means for receiving relatively clear effluent for discharge to said water recovery system.

said water recovery system including ultrafiltration means for separation of said effluent into a water permeate and an effluent concentrate, said ultrafiltration means including a semipermeable tubular membrane into one end of which said effluent is introduced axially under a first pressure and from the other end of which said effluent concentrate is recirculated in said water recovery system for further filtration and a permeate collector tube that surrounds said tubular membrane for collecting at a lower second pressure permeate that passes radially through the membrane, recirculation means including a pump means for returning a portion of said effluent concentrate from said ultrafiltration means to said aerobic digestion chamber for further reduction by biological treatment and for returning the remainder of said effluent concentrate to said ultrafiltration means for further separation into water permeate and effluent concentrate, water storage means, a secondary filtration means for polishing said water permeate, said secondary filtration means being in communication with said ultrafiltration means so that said permeate can be discharged at said second pressure from said ultrafiltration means to said secondary filtration means to be polished and discharged as clear water to said water storage means, an ultraviolet purifier for purifying the clear water from said second filtration means as it is discharged into said water storage means, said water storage means being in communication with said flush water supply means for return thereto of said water permeate.

18. A sanitary waste treatment plant comprising a delivery system, a biological treatment system, and a water recovery system, said delivery system including a flush-type toilet with a demand actuator and a bowl in which sanitary waste can be deposited, flush water supply means for transferring water from the water recovery system to the delivery system and for supplying the water as flush water to said bowl upon activation of said demand actuator, and delivery means for delivering the flush water and sanitary waste to said biological treatment system, said biological treatment system including apparatus for reducing biologically the sanitary waste received from the delivery system and discharging an effluent to said water recovery system, said biological treatment system having a low-level sensing means for sensing the level of the contents therein, and an inlet valve means in communication with a source of water and adapted to open in response to a signal from said low-level sensing means when the latter indicates that the contents are below a preselected level, said water recovery system including ultrafiltration means for separation of said effluent into a water permeate and an effluent concentrate, said ultrafiltration means having a semipermeable membrane against one side of which said effluent is passed at a first pressure and from which side said effluent concentrate is discharged, and a permeate collector member on the other side of said membrane for collecting at a lower second pressure permeate that passes through the membrane, recirculation means including pump means in communication with said biological treatment system for receiving said effluent and in communication with said ultrafiltration means for returning a portion of said effluent concentrate to said biological treatment system for further reduction by biological treatment and for returning the remainder of said effluent concentrate at first pressure to said ultrafiltration means for further separation into water permeate and effluent concentrate, said water recovery system including a flush water storage means in communication with said ultrafiltration means for receiving water permeate discharged from said ultrafiltration means at said second pressure, said water storage means having a level sensing means therein and said pump means being operable for pumping effluent from said biological treatment system through said ultrafiltration means at said first pressure in response to a signal from said level sensing means indicating that the water level is below a preselected level, said biological treatment system including high-level sensing means for sensing the level therein, said high-level sensing means being operably associated with said pump means for starting said pump means in the event said high-level sensing means is actuated by a high-level condition therein, said water storage means being in communication with said flush water supply means for return thereto of said water permeate.

19. A water-recycling sanitary waste treatment plant comprising a delivery system, a biological treatment system and a water recovery system;

said delivery system including a flush-type toilet with a demand actuator and a bowl in which sanitary waste can be deposited, flush water supply means for transferring clear water from the water recovery system to the delivery system and for supplying the clear water as flush water under pressure to said bowl upon activation of said demand actuator, and delivery means for delivering the flush water and sanitary waste to said biological treatment system in response to activation of said demand actuator;

said biological treatment system including apparatus for reducing biologically the sanitary waste received from the delivery system and discharging an effluent to said water recovery system; and, said water recovery system including ultrafiltration means for separation of said effluent into a water permeate and an effluent concentrate, said ultrafiltration means having a semipermeable membrane against one side of which said effluent is passed at a first pressure and from which side said effluent concentrate is discharged, and a permeate collector member on the other side of said membrane for collecting at a lower second pressure permeate that passes through the membrane, recirculation means including pump means in communication with said biological treatment system for receiving said effluent and in communication with said ultrafiltration means for returning a portion of said effluent concentrate to said biological treatment system and for returning the remainder of said effluent concentrate at said first pressure to said ultrafiltration means for further separation into water permeate and effluent concentrate, water storage means, a secondary filtration means for receiving and polishing said water permeate, said secondary filtration means being in communication with said ultrafiltration means and said water storage means so that said permeate can be discharged at said second pressure from said ultrafiltration means to said secondary filtration means to be polished and discharged to said water storage means as clear water, and said water storage means being in communication with said delivery system for transfer thereto of the clear water by said flush water supply means.

20. The water-recycling sanitary waste treatment plant that is defined in claim 19, wherein said water storage means has a level sensing means therein and said pump is operable to start in response to a signal from said level sensing means indicating that the water level is below a preselected level for pumping effluent from said biological treatment system through said ultrafiltration means, said biological treatment system including high-level sensing means for sensing the level therein, said high-level sensing means being operably associated with said pump for starting said pump in the event said high-level sensing means is actuated by a high-level condition therein.

* * * * *

UNITED STATES PATENT OFFICE
CERTIFICATE OF CORRECTION

Patent No. 3,950,249　　　　　　Dated April 13, 1976

Inventor(s) Leroy O. Eger, et al.

It is certified that error appears in the above-identified patent and that said Letters Patent are hereby corrected as shown below:

Column 1, line 21, "copying" should be --coping--.
Column 6, line 47, "difffuser" should be --diffuser--.

Column 8, line 22, "return conduit" should read --return bent conduit--.
Column 8, line 57, "is" should be --at--.

Column 9, line 47, "pump will" should read --pump 32 will--.
Column 9, line 56, "circuit 156" should read --circuit breaker 156--.
Column 10, line 5, "160, relay" should read --160, the relay--.

Signed and Sealed this

Twenty-fourth Day of August 1976

[SEAL]

Attest:

RUTH C. MASON
*Attesting Officer*

C. MARSHALL DANN
*Commissioner of Patents and Trademarks*